(12) United States Patent
Gonnsen

(10) Patent No.: US 10,183,750 B2
(45) Date of Patent: Jan. 22, 2019

(54) LINE CONNECTION ARRANGEMENT FOR UNITS IN AN AIRCRAFT CABIN

(71) Applicant: Airbus Operations GmbH, Hamburg (DE)

(72) Inventor: Johannes Gonnsen, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 265 days.

(21) Appl. No.: 14/957,967

(22) Filed: Dec. 3, 2015

(65) Prior Publication Data

US 2016/0159479 A1 Jun. 9, 2016

(30) Foreign Application Priority Data

Dec. 3, 2014 (DE) .................. 10 2014 117 815

(51) Int. Cl.
*B64D 11/04* (2006.01)
*B64D 9/00* (2006.01)
*B64D 11/00* (2006.01)

(52) U.S. Cl.
CPC .......... *B64D 9/003* (2013.01); *B64D 11/0007* (2013.01); *B64D 11/04* (2013.01)

(58) Field of Classification Search
CPC ........ B64D 9/003; B64D 11/007; B64D 11/04
See application file for complete search history.

(56) References Cited

U.S. PATENT DOCUMENTS

| 3,366,199 A | * | 1/1968 | Cahn | .................. | B64D 11/0007 |
| | | | | | 186/40 |
| 6,994,022 B2 | * | 2/2006 | Paleschuck | ............. | B30B 9/305 |
| | | | | | 100/111 |
| 2003/0042361 A1 | * | 3/2003 | Simadiris | ............... | B64D 11/04 |
| | | | | | 244/118.5 |

(Continued)

FOREIGN PATENT DOCUMENTS

| CA | 2941819 A1 | * | 5/2017 | ......... | B64D 11/0007 |
| DE | 19952523 | | 5/2001 | | |

(Continued)

OTHER PUBLICATIONS

German Search Report, dated Oct. 30, 2015.
European Search Report, dated Apr. 29, 2016 (Search Report for corresponding European Patent Application No. 15196956.5).

*Primary Examiner* — Magdalena Topolski
(74) *Attorney, Agent, or Firm* — Greer, Burns & Crain, Ltd.

(57) ABSTRACT

A line connection arrangement for units in an aircraft cabin having a unit, a line connector and a receiving area for a trolley. The trolley is movable over the cabin floor on laterally attached castor pairs, and is insertable from a front into the receiving area and locked therein so that its rear panel faces a back of the receiving area. The line connector is connected to a connector in the area of the floor of the cabin. A line extending between the connector and the line connector emerges at least partially out of the cabin floor in the trolley receiving area and, in the case of a locked trolley, laterally offset from the castor pairs, and, projecting at least (Continued)

partially above the cabin floor, extends towards the back of the receiving area. The line runs upwards between the trolley rear panel and the back of the receiving area.

19 Claims, 5 Drawing Sheets

(56) References Cited

U.S. PATENT DOCUMENTS

| | | | | |
|---|---|---|---|---|
| 2006/0186268 A1* | 8/2006 | Harrington | ........ | B64D 11/0007 |
| | | | | 244/118.5 |
| 2008/0116686 A1 | 5/2008 | Gonnsen et al. | | |
| 2008/0179456 A1 | 7/2008 | Diergardt | | |
| 2012/0012706 A1 | 1/2012 | Ehlers et al. | | |
| 2012/0025679 A1* | 2/2012 | Roering | ............ | B64D 11/0007 |
| | | | | 312/236 |
| 2013/0256249 A1* | 10/2013 | Burd | ...................... | B64D 11/04 |
| | | | | 211/153 |
| 2014/0291449 A1 | 10/2014 | Knepple et al. | | |
| 2015/0251761 A1* | 9/2015 | Vandyke | ................ | A47B 31/02 |
| | | | | 62/56 |
| 2016/0114892 A1* | 4/2016 | Moran | ................... | B64D 11/04 |
| | | | | 244/118.5 |
| 2017/0122647 A1* | 5/2017 | Burd | ...................... | B64D 11/04 |

FOREIGN PATENT DOCUMENTS

| | | | | |
|---|---|---|---|---|
| DE | 102005007058 | | 8/2006 | |
| DE | 102007003802 | | 8/2008 | |
| DE | 102009014601 | | 9/2010 | |
| DE | 102011119364 | | 5/2013 | |
| DE | 102013006145 | | 10/2014 | |
| EP | 2949459 A1 * | 12/2015 | ........... | B30B 9/3039 |

* cited by examiner

LINE CONNECTION ARRANGEMENT FOR UNITS IN AN AIRCRAFT CABIN

CROSS-REFERENCES TO RELATED APPLICATIONS

This application claims the benefit of the German patent application No. 10 2014 117 815.7 filed on Dec. 3, 2014, the entire disclosures of which are incorporated herein by way of reference.

BACKGROUND OF THE INVENTION

The invention relates to a line connection arrangement for units in an aircraft cabin, in particular galleys, in which at least one unit has at least one line connector as well as a receiving area for at least one trolley, which can be moved over the cabin floor on laterally attached castor pairs, and which can be inserted from the front of the receiving area into said receiving area and locked therein, so that its rear panel faces the back of the receiving area, with the line connector being connected to a connector in the area of the floor grid of the passenger cabin.

In such a design, as is known in particular for aircraft galleys, several modules are normally disposed next to one another, each of which has a receiving area for receiving a trolley, while the actual galley elements are provided inside modules above these receiving areas. These galley elements have line connectors, for example for the supply and removal of coolant, for gray water, for a vacuum or low pressure, respectively, etc. These line connectors are connected to lines, which originate from connectors in the area of the floor grid of the passenger cabin, as shown, for example, in DE 10 2005 007 058 A1. The lines run upwards in an intermediate area between two adjacent receiving areas and are connected above the receiving areas to the laterally offset line connectors of the galley elements. An intermediate area, which increases the dimensions of the entire galley unit, is therefore required for the lines, in order to connect the connectors in the area of the floor grid of the passenger cabin to the line connectors of the galley elements located in the upper section of the modules.

SUMMARY OF THE INVENTION

It is an objective of the invention to design the line arrangement for units in an aircraft cabin, in particular for galleys, in such a way that a more compact layout is achieved.

For solving this objective, a line connection arrangement of the type mentioned at the outset is designed according to the invention such that the at least one line extending between the connector and the line connector emerges at least partially out of the cabin floor in the receiving area of the trolley and, in the case of a locked trolley, laterally offset to the castor pairs thereof, and, projecting at least partially above the cabin floor, extends towards the back of the receiving area and runs upwards between the rear panel of the trolley and the back of the receiving area.

Because the vertical distance between the connector in the area of the floor grid and the line section running in the area of the cabin floor can be selected having sufficiently large dimensions, the line can be curved having a radius of curvature which is sufficient, even in the case of a line having a relatively large cross-section, such as the line for a vacuum or low pressure, respectively, (vacuum line), for example, to avoid a reduction of the cross-section in the area of the curvature.

In this regard it should be noted that a single line or several lines can run in one receiving area, and some of these lines having a relatively small cross-section can still run below the cabin floor.

In this way, the lines are thus accommodated in the unit in areas not needed otherwise, permitting the total dimensions of the unit to be reduced.

In one form, the line can run between two adjacent receiving areas in the area of the cabin floor. In another form, the line runs, in the case of a locked trolley, between the castor pairs thereof.

In another form, a panel covering the section of the line running upwards can be provided between the rear panel of the locked trolley and the back of the receiving area, significantly reducing the risk of damage to the line in this area.

The lines can be lines for the supply and removal of coolant, for a vacuum or low pressure, respectively, for gray water, for black water or for the removal of condensate (drainage line). Preferably, the at least one line is a vacuum line.

In another form, the line section running over the cabin floor can be covered. In another form, the cover can interact with the castors on the floor of the trolley to guide said trolley, which facilitates pushing the trolley into the receiving area and pulling it out of the receiving area. The cover can also have channels for collecting condensate, which run to the side of the covered line section.

The lines running between the connectors can be made from flexible hoses or from dimensionally stable pipes.

BRIEF DESCRIPTION OF THE DRAWINGS

The invention is explained in greater detail below with reference to the figures, which show schematic and highly simplified exemplary embodiments.

DETAILED DESCRIPTION OF THE PREFERRED EMBODIMENTS

Figure 1:
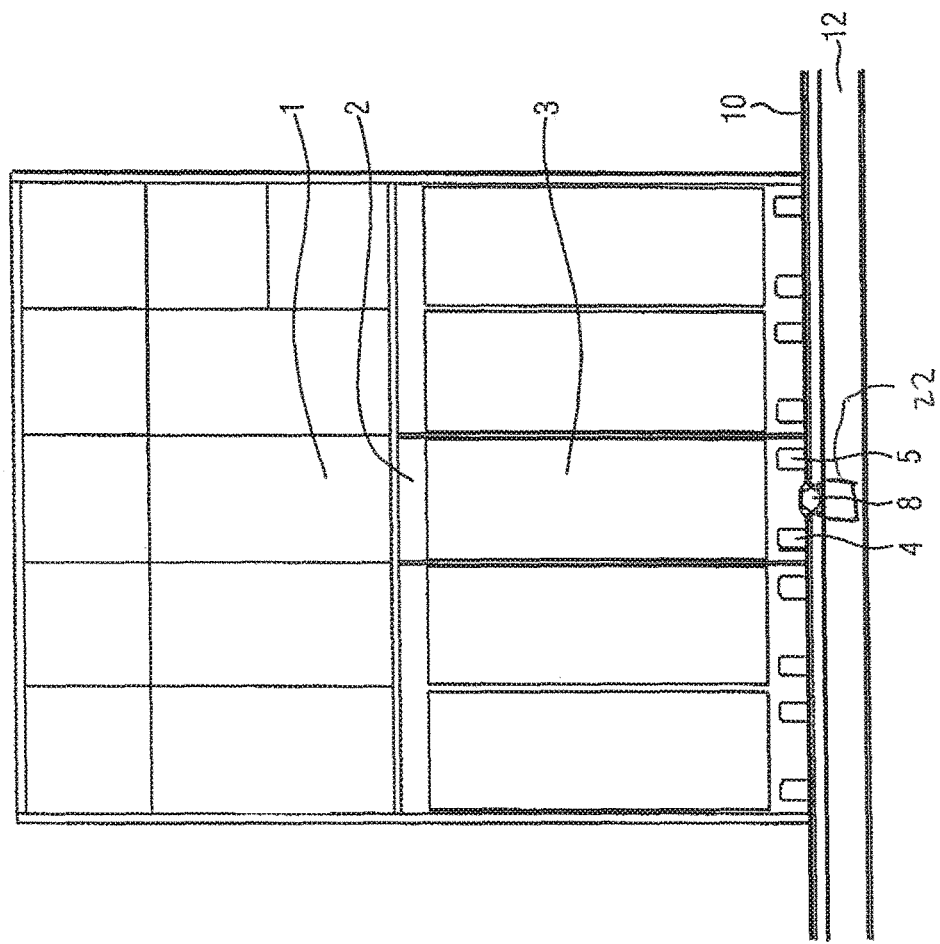
FIG. 1 shows a schematic view of an aircraft galley.

The galley depicted in a highly simplified manner in FIGS. 1 and 2 comprises five units or subunits, each of which is assigned a trolley, wherein only the center unit is identified by reference numerals, however, and the invention is described below with reference to only this center unit.

Unit 1 has a conventional upper structure, in which the various devices and accessories required for a galley are located. Between the cabin floor 10 and the upper structure, there is a receiving area 2 for a trolley 3, which has a castor pair 4, 6 and 5 (the second castor of this castor pair is not shown) at every side. The trolley 3 can travel in a conventional manner into the receiving area 2 and be locked in this inserted position.

Figure 2:
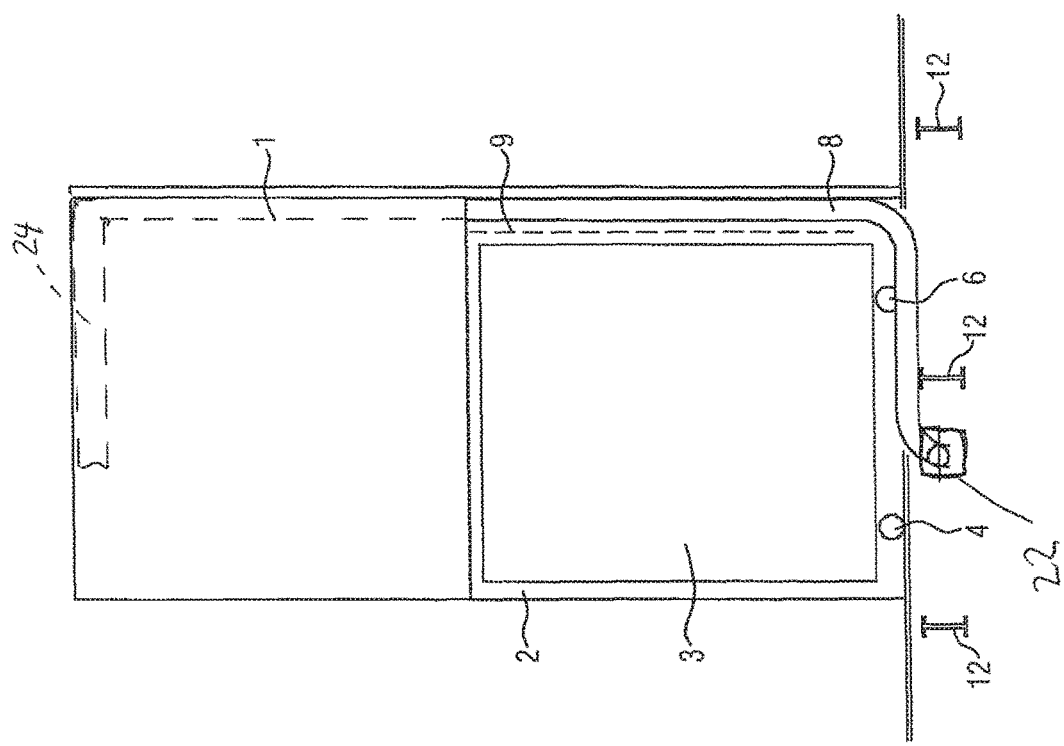
FIG. 2 shows, in a schematic side view, the center unit of the galley of FIG. 1 having an inserted trolley.
Figure 3:
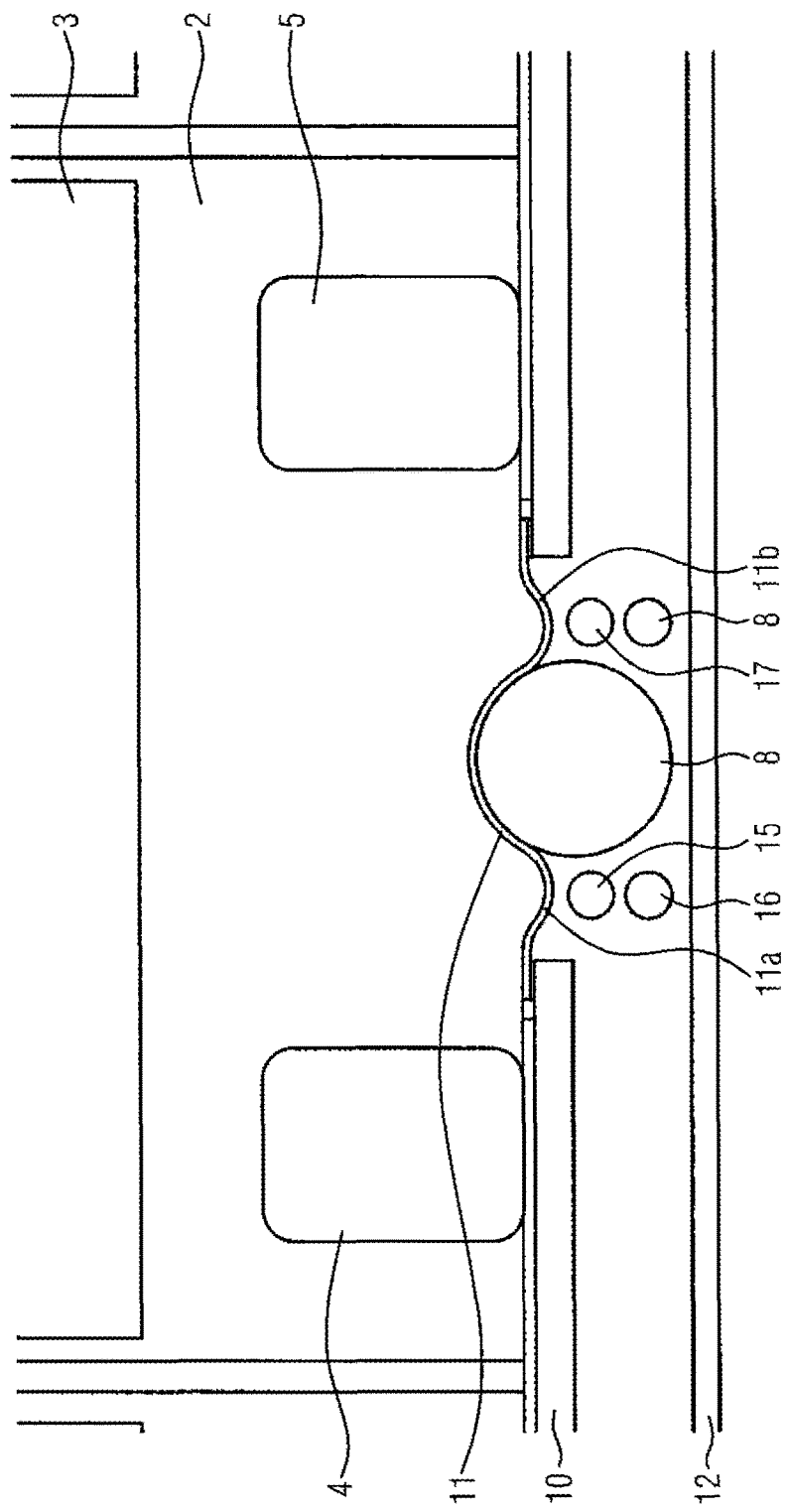
FIG. 3 shows, in a schematic partial representation, the floor part of the center unit of the galley, which floor part is somewhat modified by comparison with FIGS. 1 and 2.

The floor grid 12 is usually located below the cabin floor 10, which floor grid has connectors 22 for the supply and removal of coolant, gray water, vacuum or low pressure, respectively, etc. As shown in FIGS. 1 through 3 for one line 8 only, for example a vacuum line, in the center unit 1 of the galley, the line 8 runs upwards from the connector 22 in the floor grid 12 having a relatively large radius of curvature (FIG. 2). In the area between the two castor pairs 4, 6 and 5 of the trolley 3 which is inserted in the receiving area 2, the line exits from the cabin floor 10 and runs from there, partially projecting above the cabin floor, between the castor pairs below the floor of the trolley towards the back of the receiving area 2 and from there upwards into the top section of the unit 1. There it is connected to a corresponding line connector 24

FIG. 3 also shows a line pair 15, 16 for the supply and removal of coolant as well as a line 17 for gray water and a drainage line 18. These run essentially parallel to the line 8 and, in the area of its section projecting above the cabin floor 10, a little below the cabin floor.

In the exemplary embodiment described here, a panel 9, indicated by dashed lines, is located between the section of the line 8 extending upwards and the rear panel of the inserted trolley 3 facing this section, which panel protects the line 8 from damage when the trolley 3 is inserted into the receiving area 2.

As FIG. 3 indicates, above the section of the line 8 extending parallel to the floor of the trolley, a cover 11, which is raised relative to the cabin floor 10, and which is connected to the cabin floor 10, can be provided. Between the peripheral zones of the cover 11, which are connected to the cabin floor 10, and their raised central area, channel-shaped indentations 11a, 11b are provided, in which any condensate can be collected. The cover can also be formed integral with the line 8.

The trolley 3 is inserted in the receiving area 2 using the steerable castors of the castor pairs 4, 5, 6, wherein the castors can engage, when the trolley 3 is inserted into the receiving area 2, with the raised central area of the cover 11, thus creating a guiding means for the trolley 3, which facilitates moving the trolley 3 in and out.

Figure 4:
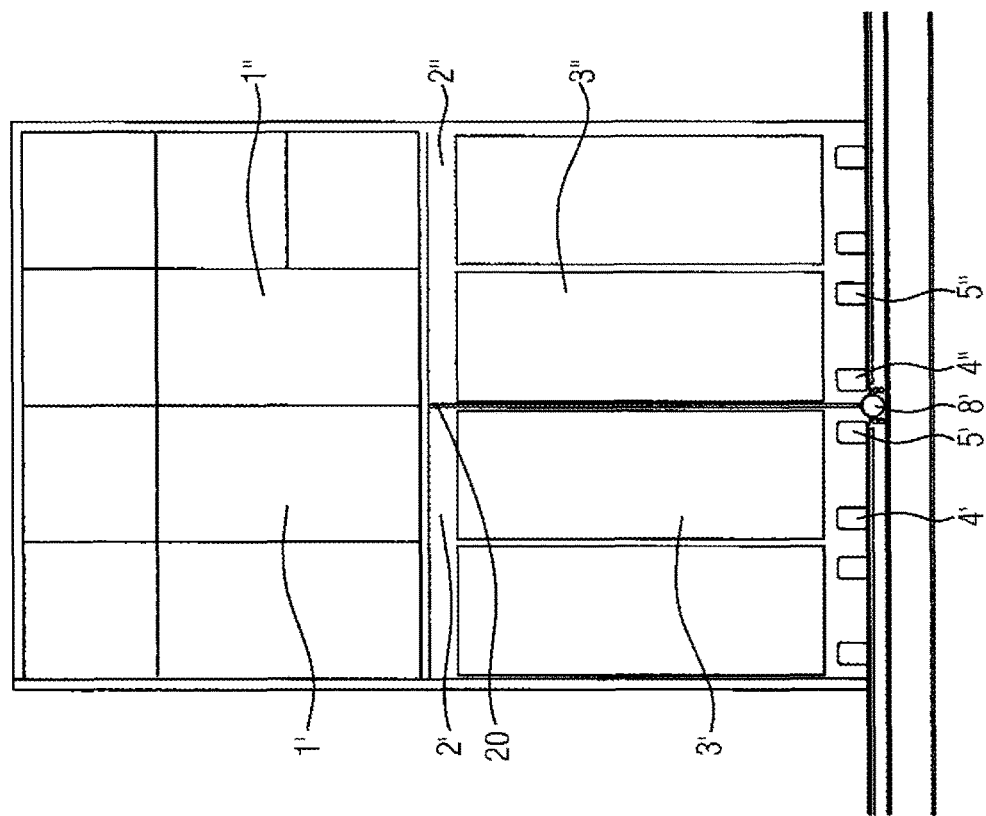
FIGS. 4 and 5 show, in representations corresponding to FIGS. 1 and 3, another exemplary embodiment.
Figure 5:
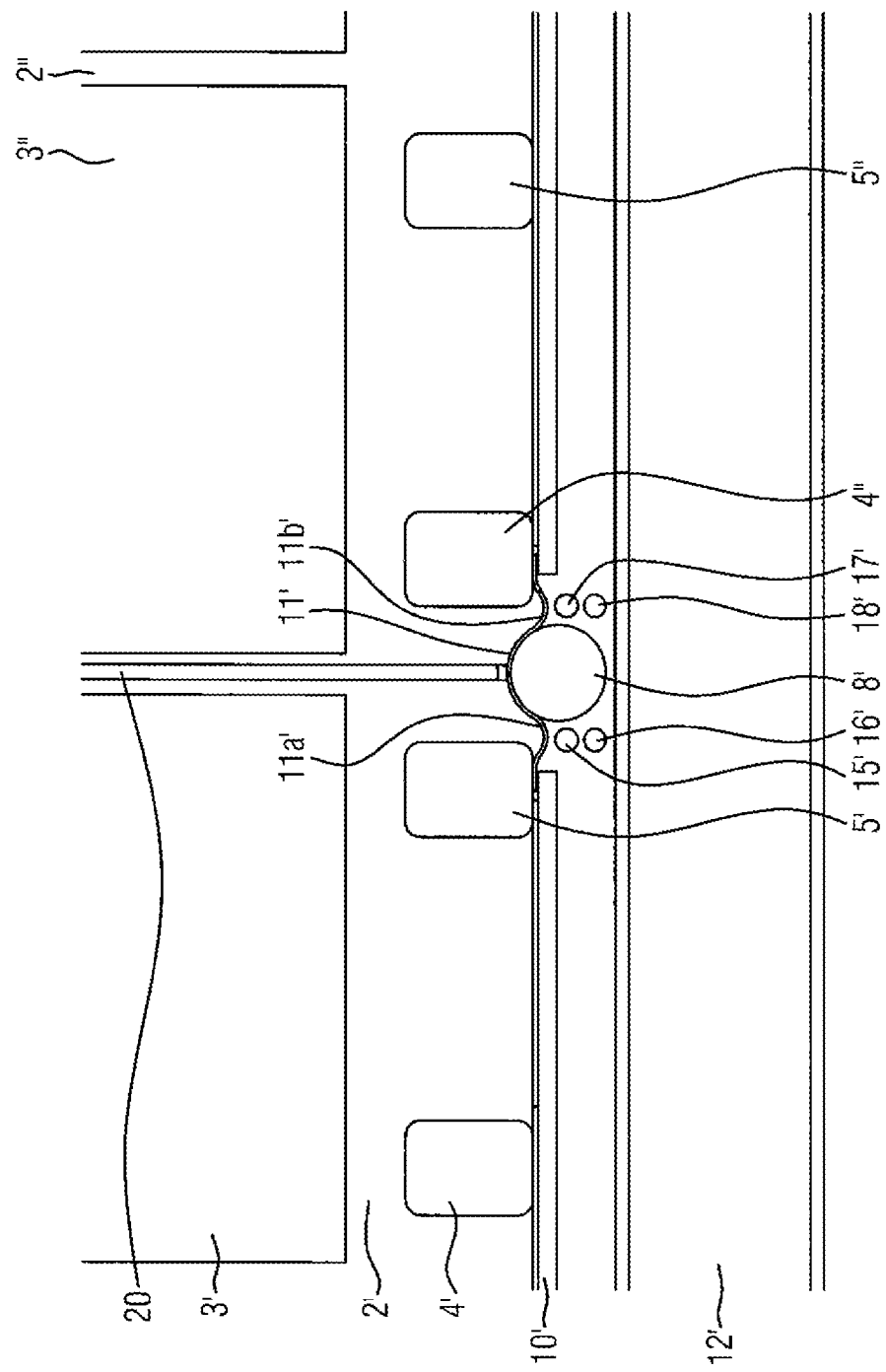

FIGS. 4 and 5 show a design which is similar to the one shown in FIGS. 1 and 3, wherein the same or corresponding parts are identified using the same reference numerals and using ' or ", and are described again in part only.

The galley shown comprises four units having two receiving areas 2' and 2" for two trolleys each. In this exemplary embodiment, the receiving areas are separated by an intermediate panel 20, which ends a short distance above the cabin floor. Located adjacent to this intermediate panel 20 are the trolleys 3' and 3". The section of the line 8', which is provided with a cover 11' and which extends in the area of the cabin floor 10', runs between the castor pairs 5' and 4" of these trolleys, and thus laterally offset thereto. Thus, also here the cover 11' can interact with the castors of the castor pairs 5', 4" in a guiding manner.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The status of the claims is as follows:

1. A line connection arrangement for units in an aircraft passenger cabin, in which at least one unit has at least one line connector as well as at least one receiving area for at least one trolley, said at least one trolley configured to be moved over a floor of the cabin on laterally attached castor pairs, and said at least one trolley configured to be inserted from a front of the at least one receiving area into said at least one receiving area and locked therein in a locked position within the at least one receiving area, so that a rear panel of the at least one trolley faces a back of the at least one receiving area, with the at least one line connector being connected to a connector in an area of a floor grid of the passenger cabin, the line connection arrangement comprising:

a line extending between the connector and the at least one line connector, the line emerging at least partially out of the cabin floor in the at least one receiving area of the at least one trolley and laterally offset from the castor pairs of the at least one trolley when in the locked position, wherein the line extends towards the back of the at least one receiving area while projecting at least partially above the cabin floor before running upwards between the rear panel of the at least one trolley and the back of the at least one receiving area.

2. The line connection arrangement according to claim 1, wherein the line connection arrangement is located in a galley of the aircraft passenger cabin.

3. The line connection arrangement according to claim 1, wherein the at least one receiving area comprises two adjacent receiving areas and the line runs between the two adjacent receiving areas in the area of the floor grid of the passenger cabin.

4. The line connection arrangement according to claim 1, wherein the line runs between the castor pairs in the area of the floor grid of the passenger cabin.

5. The line connection arrangement according to claim 1, wherein a panel covering a section of the line running upwards is provided between the rear panel of the at least one trolley in the locked position and the back of the at least one receiving area.

6. The line connection arrangement according to claim 1, wherein the line is a vacuum line.

7. The line connection arrangement according to claim 1, wherein a section of the line extending out of the cabin floor is covered by a cover.

8. The line connection arrangement according to claim 7, wherein channel-shaped indentations are formed in the cover to a side of the covered line section.

9. The line connection arrangement according to claim 7, wherein the cover is formed integral with the section of the line extending out of the cabin floor.

10. The line connection arrangement according to claim 7, wherein the cover is arranged to interact with the castors of the castor pairs of the at least one trolley to guide said at least one trolley.

11. A galley area in an aircraft cabin having a line connection arrangement for units in the aircraft cabin, comprising:

at least one unit having at least one line connector as well as at least one receiving area for at least one trolley, at least one trolley being configured to be moved over a floor of the cabin on laterally attached castor pairs, the at least one trolley being configured to be inserted from a front of the at least one receiving area into said at least one receiving area and locked therein in a locked position within the at least one receiving area, so that a rear panel of the at least one trolley faces a back of the at least one receiving area, the at least one line connector being connected to a connector in an area of the floor grid of the passenger cabin, a line extending between the connector and the at least one line connector emerging at least partially out of the cabin floor in the at least one receiving area of the at least one trolley and laterally offset from the castor pairs of the at least one trolley when in the locked position in the at least one receiving area, wherein the line extends towards the back of the at least one receiving area while projecting at least partially above the cabin floor before running upwards between the rear panel of the at least one locked trolley and the back of the at least one receiving area.

12. The galley area according to claim 11, wherein the at least one receiving area comprises two adjacent receiving areas and the line runs between the two adjacent receiving areas in the area of the floor grid of the passenger cabin.

13. The galley area according to claim 11, wherein the line runs between the castor pairs in the area of the floor grid of the passenger cabin.

14. The galley area according to claim 11, wherein a panel covering a section of the line running upwards is provided between the rear panel of the at least one trolley in the locked position and the back of the at least one receiving area.

15. The galley area according to claim 11, wherein the line is a vacuum line.

16. The galley area according to claim 11, wherein a section of the line extending out of the cabin floor is covered by a cover.

17. The galley area according to claim 16, wherein channel-shaped indentations are formed in the cover to a side of the covered line section.

18. The galley area according to claim 16, wherein the cover is formed integral with the section of the line extending out of the cabin floor.

19. The galley area according to claim 16, wherein the cover is arranged to interact with the castors of the castor pairs of the at least one trolley to guide said at least one trolley.

* * * * *